E. L. CONORD.
SPEED CHANGING DEVICE FOR AUTOMOBILES.
APPLICATION FILED DEC. 7, 1916.
1,230,125.
Patented June 19, 1917.
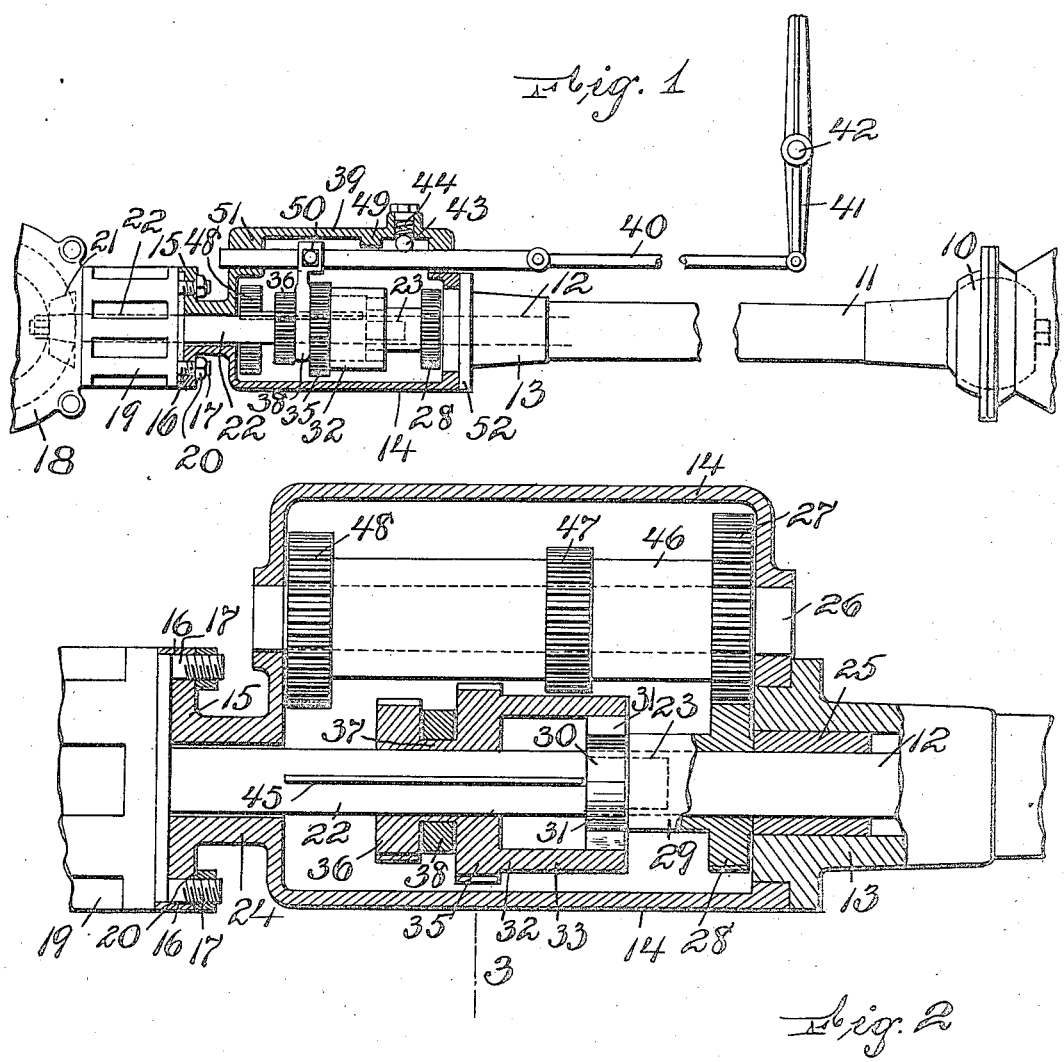
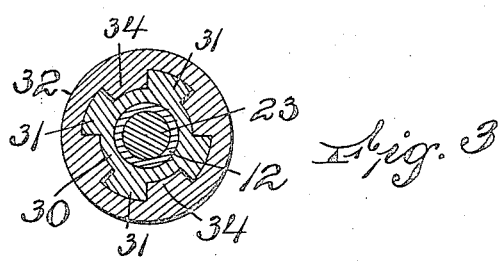

UNITED STATES PATENT OFFICE.

EUGENE L. CONORD, OF ELIZABETH, NEW JERSEY.

SPEED-CHANGING DEVICE FOR AUTOMOBILES.

1,230,125.

Specification of Letters Patent. Patented June 19, 1917.

Application filed December 7, 1916. Serial No. 135,532.

*To all whom it may concern:*

Be it known that I, EUGENE L. CONORD, a citizen of the United States, and a resident of Elizabeth, county of Union, and State of New Jersey, have invented certain new and useful Improvements in Speed-Changing Devices for Automobiles, of which the following is a specification.

This invention relates to an improved transmission gearing that is adapted to be installed either in a new car or in a car already constructed, this transmission gearing being adapted particularly for those cars having but few changes in speed provided for in the gearing of the car, these cars being of the usual type and having but two speeds, a low speed adapted for climbing grades, and a relatively high speed for use on level ground. In such cars it is also usual to use the reverse in the low. Such simple two speed cars, however, are not provided with changes of speed calculated to enable the car to be propelled in very sandy soil or on an extremely steep grade, particularly if this grade is sandy, neither are they constructed to permit an economical use of the engine by developing a higher speed than a normal high speed on roads that are excellent in shape and permit the speedy running of a light car.

The invention is adapted to provide speeds in addition to the two normal speeds of the car, such speeds permitting a speed lower than the normal low, higher than the normal high, and an intermediate speed between the two normal speeds, the transmission gearing being inclosed in a casing that is placed on the car, the casing being constructed to permit the easy operation of the transmission gearing.

Another object of the invention is to provide a transmission gearing of this kind in which a clutch connects the main shaft of the car with a short shaft attached to the gearing in the differential housing of the automobile. The construction enables the shafts, that is, the main shaft and the short shaft, to be held in alinement, to provide for an easy running clutching connection and also for the provision of a jack-shaft mounted in bearings in the casing on the transmission, the gears being adapted to be engaged to provide the various supplemental speeds, one of said gears being thrown into operative connection with the driving mechanism of the car when the clutch is disconnected in one direction, the other of said gears being connected when the clutch is thrown in the other direction, but when the clutch is operated, neither of these gears is engaged, thus making a selective type of transmission which is convenient to operate, occupies but little space and which is not liable to be easily broken.

The device is further designed to provide a casing for the gearing which is adapted to provide stops for the movement of the clutch-shifting device so that the operator of the gearing will be assured that the gears to be in mesh are securely connected in operative relation.

The invention is illustrated in the accompanying drawings, in which is illustrated my improved transmission gearing, and it is illustrated as applied to a Ford car, since it is particularly adapted for use on Ford cars, but it will be understood that it can be used on other cars having but two changes of gearing, and it will also be borne in mind that this device can be used with cars having more than two changes of gearing, if desired.

In said drawings, Figure 1 is a view of so much of an automobile as to permit of a thorough understanding of the invention and the relation of the improved gearing to the older parts of the car. Fig. 2 is a horizontal section of Fig. 1 on a larger scale and showing the casing and the gearing therein, and Fig. 3 is a section on line 3 in Fig. 2 showing particularly the form of clutch illustrated in the drawings.

The drawing shows an ordinary casing 10 which indicates the forward part of the driving mechanism toward the engine, the casing 10 inclosing the main transmisson gearing which is not shown, the change of the two normal high and low speeds being provided for in front of this point. The housing 11 extends rearwardly and incloses the main drive shaft 12, the housing having, on its end, a bearing 13 which fits in the end of the casing, 14, the casing 14 inclosing a chamber to receive the gearing to be hereinafter described, said casing 14 terminating in a flange 15 which is provided with holes 16 fitting over the bolts 17 that extend forward from the differential housing 18 and pass through the roller-bearing housing 19, the nuts 20 being used to fasten the casing at this end in place. It will thus be seen that a substantially rigid and stable inclosing structure is devised for protecting the rotating parts from dust, the parts above enumerated, with the exception of the casing 14 and the bearing 13, being old. In the differential housing is the gearing which transmits power to the rear axle of the car, one of the gears, 21, being fastened to a short shaft 22 which projects forward and has its front end reduced as at 23 and fitting in a recess in the end of the drive shaft 12, the shafts thus being held in alinement, but being permitted to have rotation relative to each other. The flange 15 and the neck 24 are provided with a bore to permit the shaft to slide freely, since the shaft is journaled and supported in the roller-bearing housing 19. The casing 14 receives the bearing 13 in the end opposite the flange 15, the bearing having suitable metal 25, such as Babbitt metal, to provide for the easy rotation of the main shaft 12.

In a side extension of the casing 14 is mounted a jack-shaft 26, which jack-shaft is rotated by a gear 27 in constant mesh with a gear 28 on the shaft 12. The gear 28 is provided with a collar 29, on the end of which is a clutch member 30 which consists of projecting lugs 31 to the desired number, the collar 29 and the clutch member 30 surrounding the shaft 12 and acting to support and stiffen this end of the shaft which is its recessed end and thus apt, unless so strengthened, to give way under an abnormal strain. On the short shaft 22 is a sliding clutch member 32 consisting of the forwardly extending barrel portion 33 which is provided with projections 34 to fit in the spaces between the projections 31 of the clutch member 30, the fixed clutch member 30 thus being adapted to be entered by the clutch member 32, and the lugs extending from end to end in each clutch member and the spaces between the projections in the clutch members being open from end to end, the clutch members can be separated by sliding them either forward or backward from their normal or engaging position. The clutch member 32 is provided with a gear 35 on the end opposite the projections 36 and is provided with a second gear 36, these gears being connected by a neck 37 of less diameter so that a space is provided for the fork or similar engaging part 38, which part 38 is secured to a shift rod 39 which is connected at its forward end to a suitable manually operated device for shifting the same, in the form shown this consisting of a rod 40 connected to a lever 41, pivoted at 42 and adapted to be operated from the driver's seat. The parts are shown in the figures of the drawing as being in normal position, that is, to provide for an unaltered transmission of the normal high or low gear of the automobile, these parts being held in such position by any suitable yielding means, the form shown comprising a ball 43 which is pressed by a spring 44 into a recess so disposed in the shift rod 39 that when it is engaged by the ball 43 the parts are in such normal position. The clutch member 32 with its two gears 35 and 36 slides on the short shaft 22 but is adapted to turn therewith. Suitable means, such as a feather 45, being used for this purpose. The gears 35 and 36 are of different diameters and are adapted to mesh with the gears mounted to rotate on the jack-shaft 26 and to be connected to the gear 27. In the form shown the gear 27 is mounted on a sleeve 46 which it is adapted to drive, said sleeve having a gear 47 in front of the gear 35 and a gear 48 in rear of the gear 36. It will be understood that these designations of forward and rear are used to make the description clear, but a reversal of the parts, for bringing about the same operation, is embraced in such description.

When one of the normal speeds of the car is to be used, either the high or the low, the clutch 32 is held in the normal position illustrated in the drawing and there is a direct connection between the shaft 12 and the short shaft 22 through the clutch comprising the fixed clutch member and the movable clutch member. When, however, one of the normal gears of the car is to be changed, for instance, if it is desired to have a higher gear than the normal high of the car, a gear higher than the normal low of the car, or a gear lower than such normal high and low gears of the car, it can be brought about by shifting the clutch member. In the form illustrated if the clutch member 32 is pushed forward the projections 34 and 31 are disengaged and the gear 35 engages the gear 47 and the gear 47 being smaller than the gear 35, the speed at which the car is running is reduced.

In order to provide for a positive meshing of such gears I provide a stop 49 in the casing, which stop is adapted to be engaged by the collar 50 by means of which the fork or other shifting portion 38 is fastened to the shift rod 39.

When the car is running normal, as above described, and it is desired to reduce the speed of the normal running of the car, the clutch member 32 is slid backward, the two members of the clutch being thus disconnected and the gear 36 is placed into mesh with the gear 48 and the speed of the car is increased, since the gear 36 is smaller than the gear 48. To provide for a positive seating of the parts, permitting the operating lever to be thrown until it is positively stopped, I provide a stop 51 in the casing against which the collar 50 is adapted to be seated when the gears 36 and 48 are in mesh.

The stops 49 and 51 are thus disposed where there is no strain on the driving parts of the automobile when the stopping is done, and they give a sense of security to the operator, since the lever 41 or other operating device can be moved until it is positively stopped and thus indicates that the parts are seated in proper operative positions.

It will be evident from this description that the gearing in the casing is of the selective type, the clutch member that slides on the short shaft being moved in one direction from its normal or clutching position for one change of speed, and being moved in the opposite direction from its clutching position to provide the other change of speed.

The device is easily installed in the car, since the housing 11 is cut off at the front point to receive the bearing 13, and the gap thus formed between the bearing 13 and the roller-bearing housing 19 is taken up by the casing 14 which is securely fastened to the roller-bearing housing and encircles the bearing 13, being held against any forward movement and also holding the housing against any rearward movement by reason of a flange 52 bearing against the front face of the casing 14.

Having thus described my invention, I claim:

1. In a vehicle, a drive shaft, a housing for the drive shaft, a short shaft, a housing from which the short shaft projects, studs projecting from the latter housing, a casing secured to said studs and secured to the housing of the drive shaft, the drive shaft and the short shaft abutting, one of said shafts being reduced on one end and fitting in a recess in the other, a jack-shaft in the casing, sliding gears on the short shaft, a clutch member to which said sliding gears are secured, a gear on the driving shaft, a clutch member secured to the last-mentioned gear and with which the clutch member on the short shaft can be engaged and through which it can slide, and gears on the jack-shaft adapted to be engaged each by one of the gears on the sliding clutch member according to which direction the sliding clutch member is moved from the fixed clutch member.

2. In a transmission, a casing, shafts projecting into said casing, said shafts being alined and one recessed to receive a reduced end of the other, a clutch member fixed to the recessed end and embracing it to form a strengthening portion, and a sliding clutch member on the other shaft and adapted to move into and out of engagement with the fixed clutch member.

3. In a transmission, a casing, shafts projecting into said casing, said shafts being alined and one recessed to receive a reduced end of the other, a clutch member fixed to the recessed end and embracing it to form a strengthening portion, the said clutch member having a set of spaced lugs thereon, a sliding clutch member with lugs to fit in the spaces between the lugs of the fixed clutch member and capable of sliding to both sides thereof, a jack-shaft in the casing, a gear on the jack-shaft, a gear on the recessed shaft, said gears being in constant mesh, gears on the sliding clutch member, and gears on the jack-shaft rotating with the constantly meshing gear on the jack-shaft, said gears on the jack-shaft being disposed so that the clutch member gears are between them when the clutch members are in engagement, one of said jack-shaft gears being adapted to be engaged by one of said clutch member gears according to the direction the clutch member is slid.

4. In a transmission, a casing, alined shafts in said casing, clutch members on the ends of said shafts, one of said members being adapted to slide to both sides of the other member, gears on the sliding clutch member, a jack-shaft, gears on the jack-shaft and adapted to be selectively engaged by the clutch gears according to the direction of disengagement of the clutch members, a shifting means for the sliding clutch member, and stops in the casing for limiting the sliding of the clutch member when the gears are selectively engaged.

5. In a transmission, alined shafts, a clutch member fixed to one of said shafts, a clutch member slidable on the other shaft through the first named clutch member in both directions, and means comprising a shaft parallel to said alined shafts and gears on said parallel shaft and gears on said alined shafts whereby the second of the alined shafts is rotated from the first named alined shaft when the slidable clutch member is moved either way through and beyond the fixed clutch member.

6. In a transmission, alined shafts, a clutch member fixed to one of said shafts, a clutch member slidable on the other shaft through the first named clutch member in both directions, and means comprising gears whereby the second shaft is rotated from the first shaft when the slidable clutch member is moved either way through and beyond the fixed clutch member.

In testimony that I claim the foregoing, I hereto set my hand, this 6th day of December, 1916.

EUGENE L. CONORD.